(12) United States Patent
Taneda

(10) Patent No.: US 6,382,682 B1
(45) Date of Patent: May 7, 2002

(54) EXTENDABLE PIPE JOINT

(75) Inventor: Shinsaku Taneda, Saitama (JP)

(73) Assignee: Tozen Sangyo Co., Ltd., Saitama (JP)

( * ) Notice: Subject to any disclaimer, the term of this patent is extended or adjusted under 35 U.S.C. 154(b) by 0 days.

(21) Appl. No.: 09/757,280

(22) Filed: Jan. 9, 2001

(30) Foreign Application Priority Data

Sep. 21, 2000 (JP) ....................... 2000-286261

(51) Int. Cl.[7] ................................................. F16L 27/12
(52) U.S. Cl. ....................... 285/300; 285/228; 285/900; 285/299
(58) Field of Search ........................... 285/900, 95, 99, 285/227, 228, 299, 300, 301

(56) References Cited

U.S. PATENT DOCUMENTS

| | | | | |
|---|---|---|---|---|
| 3,198,558 A | * | 8/1965 | Braden | 285/228 |
| 3,241,868 A | * | 3/1966 | Soderberg | 285/228 |
| 3,359,016 A | * | 12/1967 | Sarlls, Jr. | 285/228 |
| 3,492,030 A | * | 1/1970 | Harrison et al. | 285/300 |
| 3,722,926 A | * | 3/1973 | Fukushima | 285/900 |
| 4,932,687 A | * | 6/1990 | Anderson et al. | 285/299 |
| 4,936,883 A | * | 6/1990 | Larsson et al. | 285/227 |
| 5,069,488 A | * | 12/1991 | Freyer et al. | 285/900 |
| 5,603,531 A | * | 2/1997 | Maier | 285/300 |

* cited by examiner

Primary Examiner—Eric K. Nicholson
(74) Attorney, Agent, or Firm—Flynn, Thiel, Boutell & Tanis, P.C.

(57) ABSTRACT

The present invention provides an extendable pipe joint wherein the cylindrical pipe joint comprises first and second external cylinders disconnectably connected to each other; a first pressure-balancing cylinder is set in the first external cylinder; a second pressure-balancing cylinder is set in the second external cylinder so that it can be moved with a coupling lever in the axial direction; the first and second pressure-balancing cylinders have first and second pressure-balancing plates opposite to each other and are connected to each other with a first bellows; the second pressure-balancing cylinder and the second external cylinder are connected to each other with a second bellows; nozzles are formed on peripheral walls of the first and second pressure-balancing cylinders; and openings of the first and second pressure-balancing cylinders are connected to piping. Because of the features described above, the extendable pipe joint according to the present invention does not require a difficult work for setting an anchor thereon, nor cause increase in the construction cost. Further a large-scale and difficult work is not required when a valve is to be removed from the pipe joint.

4 Claims, 2 Drawing Sheets

US 6,382,682 B1

EXTENDABLE PIPE JOINT

BACKGROUND OF THE INVENTION

The present invention relates to an extendable joint for piping to be embedded or spanned such as those for sending oil, wind, vapor, hot water or the like.

In the piping to be embedded or spanned as described above, generally a bellows type of extendable pipe joint is installed for accommodating extension or contraction generated in the axial direction due to change in temperature.

In the case as described above, however, a thrust force which is proportional to a product of an effective cross section of the bellows and a pressure is generated, and it is required to provide an anchor on the piping to accommodate a sum of the thrust force and that required for contraction. In addition, a valve set on the piping must be removed from the piping each time the piping is serviced periodically or replaced with new one.

In the piping as described above, when a bore of the piping is large or a high pressure is loaded to the piping, the work for setting an anchor is very difficult because of the thrust force, which causes increase in the construction cost, and when the valve is removed, even if bolt nuts connecting the valve to the piping are removed, it is difficult to remove the valve, so that the piping must be displaced in the axial direction, so that a large scale and hard work is required to achieve the object.

An object of the present invention is to provide an extendable joint which can solve the problems relating to the conventional embedded or spanned piping as described above, and also which does not require a large-scale and difficult work for setting a work, not cause cost increase due to difficulty in removing the valve.

To achieve the object as described above, the present invention provides an extendable pipe joint, wherein the cylindrical body thereof comprises first and second external cylinders removably connected to each other; a first pressure-balancing cylinder is set in the first external cylinder; a second pressure-balancing cylinder is set in the second external cylinder so that the second pressure-balancing cylinder can be moved with a coupling lever in the axial direction; the first and second pressure-balancing cylinders have first and second pressure-balancing plates opposite to each other and are coupled to each other with a first bellows; the second pressure-balancing cylinder and second external cylinder are coupled to each other with a second bellows; nozzles are formed on peripheral walls of the first and second pressure-balancing cylinders; and opening sections of the first and second pressure-balancing cylinders are communicated to the piping respectively.

Further in the present invention, an air hole communicating a space between the first pressure-balancing plate and the second pressure-balancing plate to outside is provided on the peripheral wall of the first pressure-balancing cylinder, and in the invention of Claim 3, inside of the second bellows is communicated to the outside at the opening section of the second external cylinder. In the invention of Claim 4, a drain exhaust is formed in the second external cylinder.

DESCRIPTION OF THE PREFERRED EMBODIMENT

Figure 1:
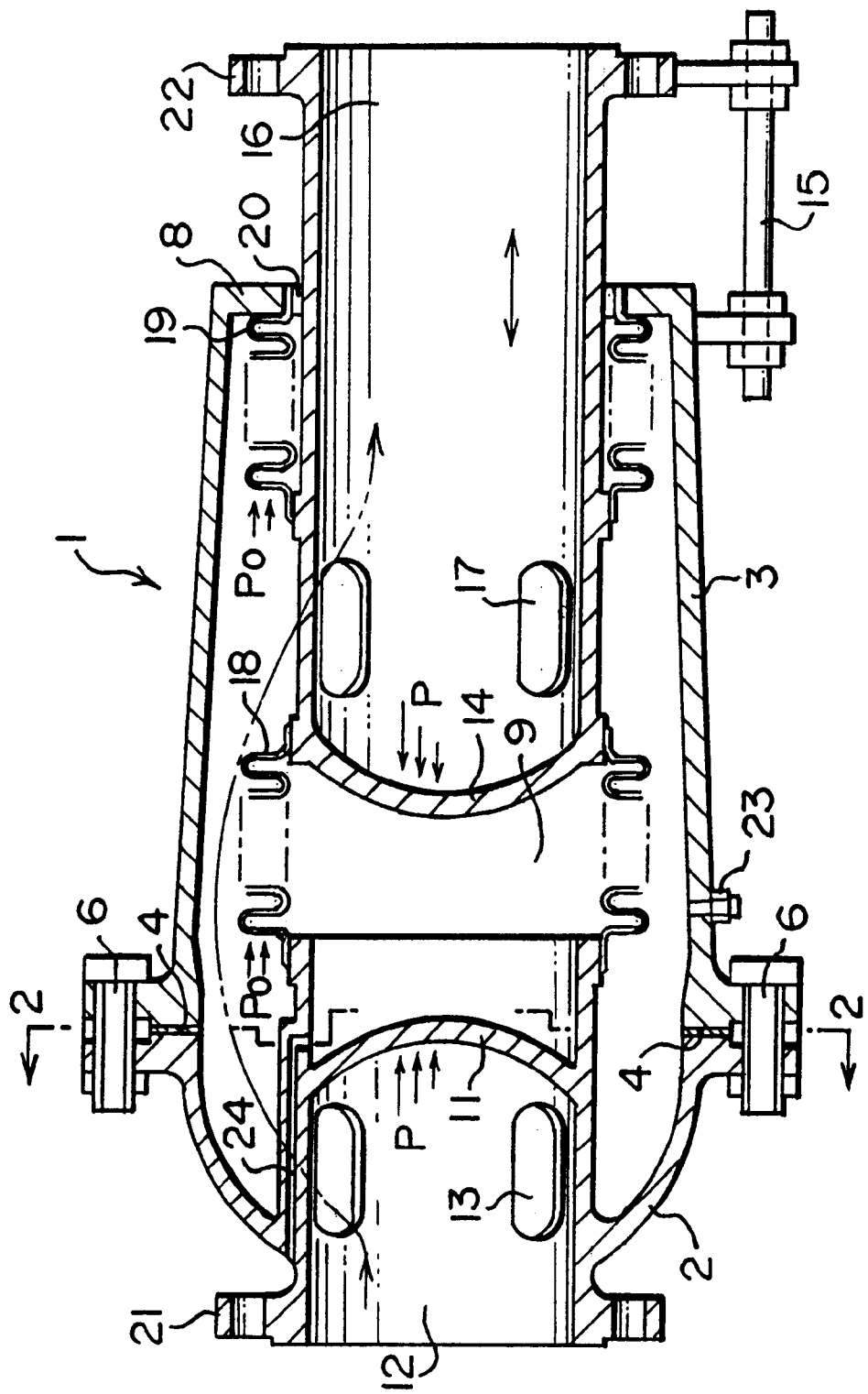
FIG. 1 is a longitudinal cross section of an extendable pipe joint according to one embodiment of the present invention.
Figure 2:
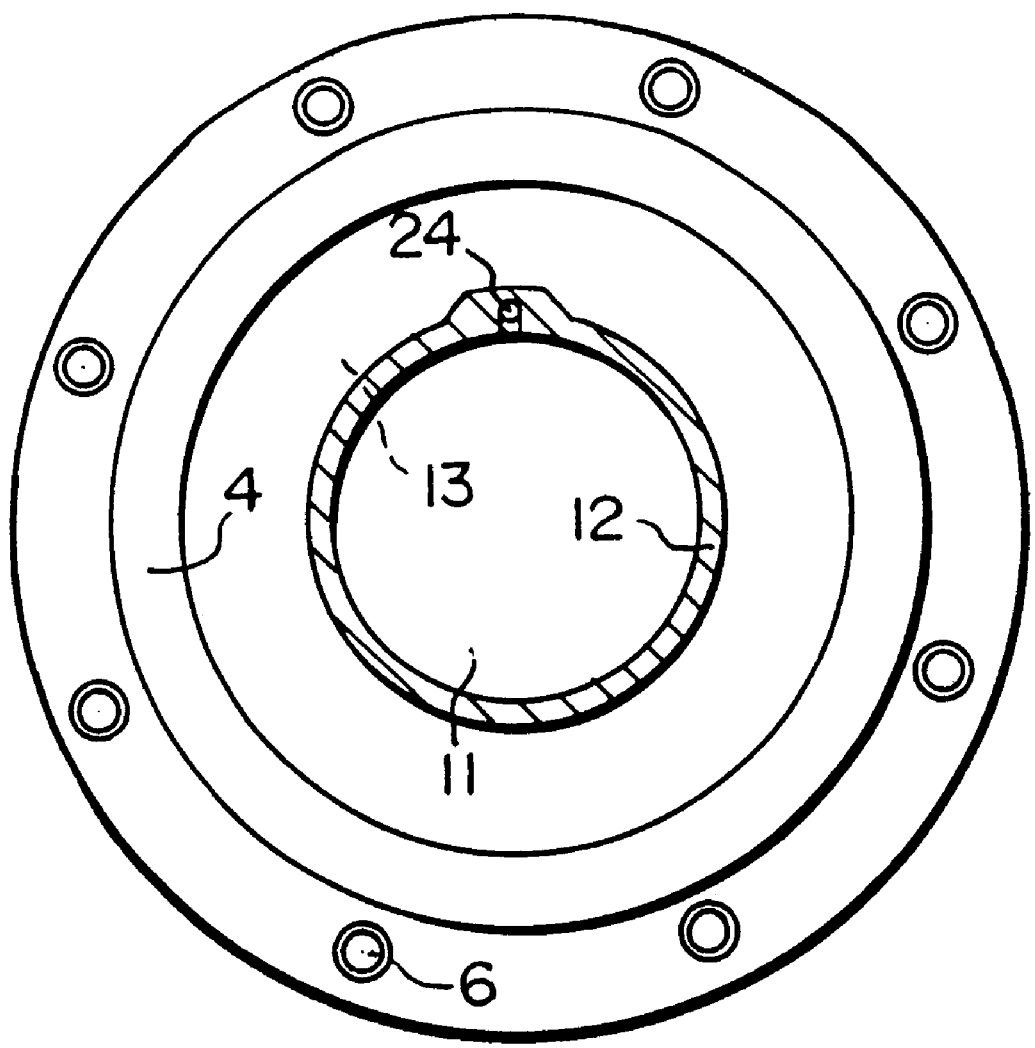
FIG. 2 is a cross section taken along the line 2—2 in FIG. 1.

In the embodiment of the present invention shown in the figures, designated at the reference numeral 1 is a cylindrical joint body, and this joint body 1 comprises first and second external cylinders 2, 3. These first and second external cylinders 2, 3 has openings at both outer and inner side edges respectively with a gasket 4 provided therebetween, and are removably connected with a coupling member 6 to each other.

Openings 7 and 8 are provided at outer side edges of the first and second external cylinders 2, 3, and a first pressure-balancing cylinder 12 extending inward and having a first pressure-balancing plate 11 at its tip are communicated to the opening 7. In the first pressure-balancing cylinder 12, a flange 21 to which a flange of piping or a valve not shown is coupled and a first nozzle 13 provided on the peripheral surface are provided.

Provided in the second external cylinder 3 is a second pressure-balancing cylinder 16 having a second pressure-balancing plate 14 at its tip so that it can be moved with a coupling lever 15 in the axial direction. Further provided in the second pressure-balancing cylinder 16 are provided a flange 22 to which a flange of piping not shown is coupled and a second nozzle 17 provided on the peripheral surface thereof.

An external peripheral of the front edge of the first pressure-balancing cylinder 12 and that of the front edge of the second pressure-balancing cylinder 16 are coupled to each other with a first bellows 18, and the second pressure-balancing cylinder 16 and an internal periphery of the opening 8 of the second external cylinder 3 are coupled to each other with a second bellows 19. A ventilating clearance 20 is formed between the internal periphery of the opening 8 and the external periphery of the second pressure-balancing cylinder 16 with the inside of the second bellows communicated to the outside at an opening of the second external cylinder 3. The reference numeral 23 indicates a drain exhaust provided on the second external cylinder 3.

In the embodiment having the configuration as described above, when a valve is coupled to the first external cylinder 2 with piping connected to the second external cylinder 3 or the piping is connected to the first and second external cylinders 2, 3, the internal pressure P inside the piping is loaded as an external pressure $P_0$ from the first pressure-balancing plate 11 of the first pressure-balancing cylinder 12 via the first nozzle 13 of the first pressure-balancing cylinder 12 onto the first and second bellows 18, 19 of the first and second pressure-balance cylinders 12, 16, and further via the second nozzle 17 of the second pressure-balancing cylinder 16 onto the second pressure-balancing plate 14. A fluid flows from the first nozzle 13 of the first pressure-balancing cylinder 12, passes through the second nozzle 17 of the second pressure-balancing cylinder 16, and flows to the second pressure-balancing cylinder 16. Thus the thrust force generated by the internal pressure is canceled and balanced.

In this state, when the piping extends or contracts due to change in temperature and the first bellows 18 contract, the second bellows 19 extend, and when the first bellows 18 extend, the second bellows 19 contract. The space 9 between the first pressure-balancing cylinder 12 and the second pressure-balancing cylinder 16 and inside of the second bellows are communicated through the air hole 24 and the ventilating clearance 20 to the atmosphere and the pressures there are reduced to the atmospheric pressure, so that the first bellows 18 and second bellows 19 can expand or contract irrespective of the thrust force generated by the internal pressure P.

Because of extension and contraction of the piping, a sum of a reaction force for contraction of the first bellows 18 and a reaction force for contraction of the second bellows 19 is loaded to an anchor as a force required for contracting the first and second bellows 18, 19, so that it is required only to set an anchor capable of resisting the total reaction force for contraction.

With the configuration as described above, in a case where a valve provided on the piping is communicated to the first external cylinder 2, if it is required to remove the valve from the piping to be embedded or spanned for periodical repair or maintenance, the flange 22 of the second pressure-balancing cylinder 16 is disconnected from the flange of the piping, and the second pressure-balancing cylinder 16 is pushed into the second bellows 19 compressing the latter in the axial direction to form an empty space. In this state, the valve can easily be removed from the piping making use of the empty space.

As described above, in the extendable joint according to the present invention, the cylindrical joint body comprises first and second external cylinders disconnectably connected to each other; a first pressure-balancing cylinder is set in the first external cylinder; a second pressure-balancing cylinder is set in the second external cylinder so that it can be moved with a coupling lever in the axial direction; the first and second pressure-balancing cylinders have first and second pressure-balancing plates opposite to each other and are coupled to each other with a first bellows; the second pressure-balancing cylinder and second external cylinder are coupled to each other with a second bellows; nozzles are formed on peripheral walls of the first and second pressure-balancing cylinders; and openings of the first and second pressure-balancing cylinders are coupled to the piping. With the configuration described above, a sum of a reaction force for contraction of the first bellows and a reaction force for contraction of the second bellows is loaded to an anchor as a force required to expand or contract the first and second bellows, and it is required only to provide an anchor capable of resisting the total reaction forces on the piping. Therefore the work for installing an anchor can easily be carried out, and when a valve is coupled to one of the external cylinders, if it is required to remove the valve, a flange of the second pressure-balancing cylinder is disconnected from a flange of the piping, and the second pressure-balancing cylinder is pushed into the second bellows compressing the latter to form an empty space. Because of this feature, the valve can easily be removed from the piping by making use of the empty space.

Further in the present invention, an air hole communicating a space between the first pressure-balancing plate and the second pressure-balancing plate to the outside is provided on a peripheral wall of the first pressure-balancing cylinder, and in the invention of Claim 3, inside of the second bellows is communicated to the outside at an opening of the second external cylinder, so that an unnecessarily excessive force is not required for extending or contracting the bellows.

Further a drain exhaust is formed in an external cylinder of the extendable pipe joint according to the present invention, so that inside of the pipe joint is not contaminated.

What is claimed is:

1. An extendable pipe joint, comprising a cylindrical joint body comprising first and second external cylinders disconnectably connected to each other; a first pressure-balancing cylinder is set in a first external cylinder; a second pressure-balancing cylinder is set in a second external cylinder so that it can be moved with a coupling lever in the axial direction; the first and second pressure-balancing cylinders having first and second pressure-balancing plates opposite to each other and being coupled to each other with a first bellows; the second pressure-balancing cylinder and second external cylinder are coupled to each other with a second bellows; nozzles are formed on peripheral walls of the first and second pressure-balancing cylinders; and openings of the first and second pressure-balancing cylinders are coupled to piping.

2. The extendable pipe joint of claim 1, wherein an air hole which communicates space between the first and second pressure-balancing plates to the outside is provided on the peripheral wall of the first pressure-balancing cylinder.

3. The extendable pipe joint of claim 1, wherein inside of the second bellows communicates the outside at an opening of the second external cylinder.

4. The extendable pipe joint of claim 1, wherein a drain exhaust is formed in the second external cylinder.

* * * * *